United States Patent [19]
Anthony

[11] 3,889,724
[45] June 17, 1975

[54] PLURAL APERTURE DISPENSER

[76] Inventor: Donald L. Anthony, 731 Crossbrook Dr., Moraga, Calif. 94556

[22] Filed: Oct. 3, 1973

[21] Appl. No.: 403,203

[52] U.S. Cl. ............... 141/1; 141/237; 141/391
[51] Int. Cl. .............................................. B65b 1/04
[58] Field of Search ............ 53/390; 99/407; 141/1, 141/9, 132, 134, 234, 237–241, 247, 311, 141/314, 363–366, 390, 391, 231; 198/46, 198/50, 64, 68; 193/14, 29

[56] References Cited
UNITED STATES PATENTS

| | | | |
|---|---|---|---|
| 220,609 | 10/1879 | Hartley | 141/234 |
| 1,747,129 | 2/1930 | Pagano | 141/234 X |
| 2,027,830 | 1/1936 | Krein | 141/237 |
| 3,693,673 | 9/1972 | Oates | 141/237 |

*Primary Examiner*—Richard E. Aegerter
*Assistant Examiner*—Frederick R. Schmidt
*Attorney, Agent, or Firm*—Phillips, Moore, Weissenberger Lempio & Strabala

[57] ABSTRACT

A method and apparatus is provided for improved loading of frozen french fries on conventional storage racks used by the fast food industry. A plural aperture dispenser having angled bounce surfaces is provided for use in conjunction with standard fry baskets and storage racks.

8 Claims, 10 Drawing Figures

PATENTED JUN 17 1975 3,889,724

SHEET 1

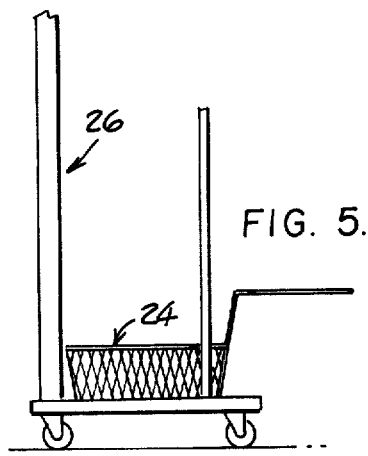
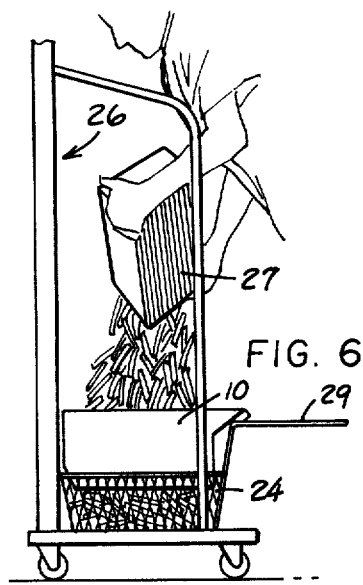
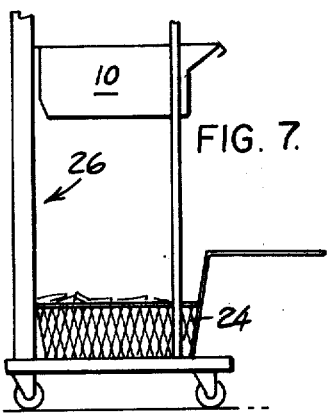
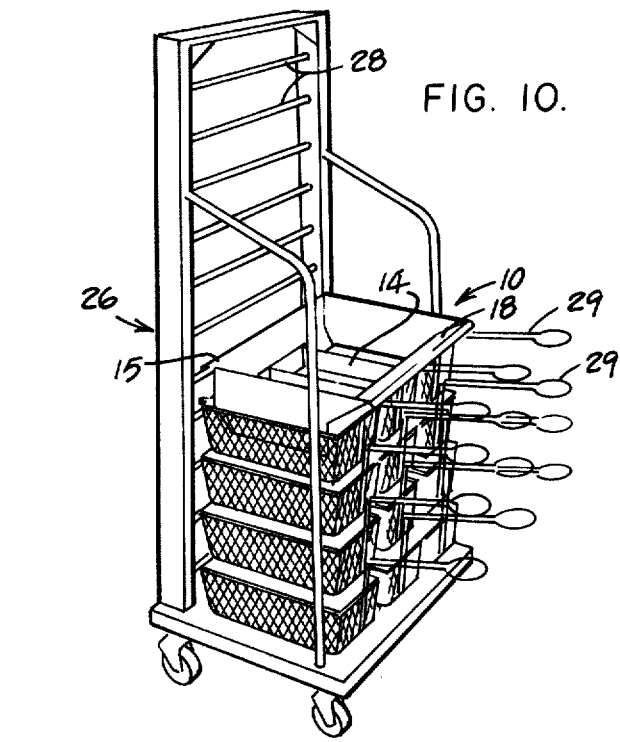
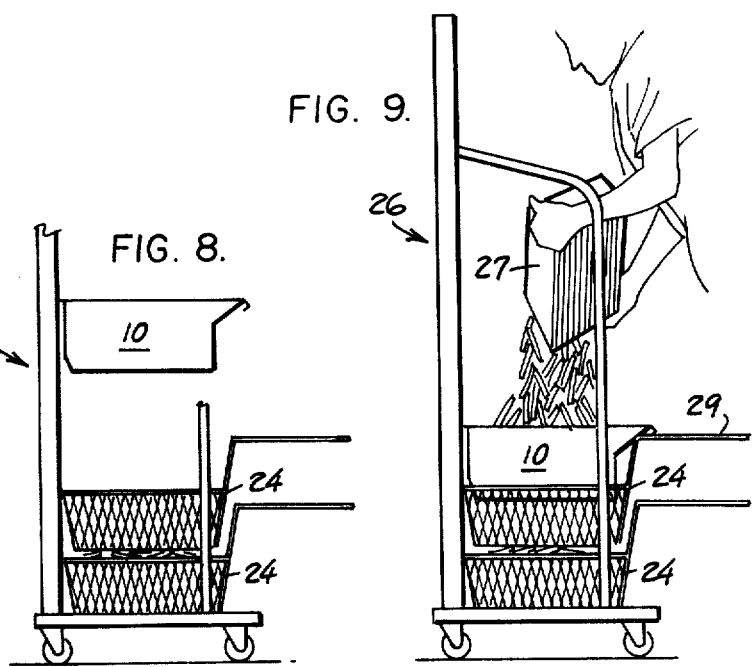
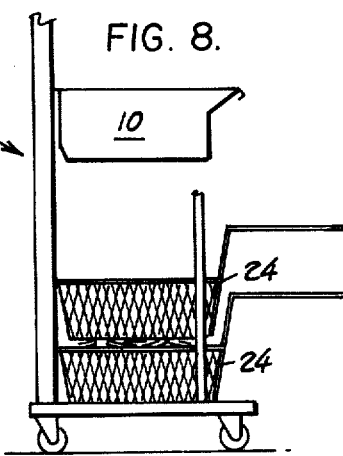

PLURAL APERTURE DISPENSER

BACKGROUND OF THE INVENTION

This invention relates to the handling of french fried potatoes within the fast food industry. In particular, this invention is directed to a means and method for facilitating the transferral of uncooked french fries from storage to fry basket.

Profits in the fast food industry are closely correlated with the volume of business that is done and labor costs, as well as with the amount of waste that occurs. Thus, methods and means, whereby efficiency of food handling is maximized while at the same time food waste is minimized, are constantly being sought within the fast food industry.

The handling of frozen potatoes prepared for a french frying is generally regarded as one of the more inefficient aspects within the fast food industry. Typically, the raw, sliced frozen potatoes are removed from storage and transferred to baskets which are then placed on a conveyance such as a standard rollable storage rack. After the storage rack has been filled with its complement of baskets it is moved to the vicinity of the french fryer, and the baskets are removed and placed in the fryer as french fries are required.

Unfortunately, the raw prepared potatoes are both frangible and perishable, and it has been found that conventional handling methods have frequently proved to be inefficient and wasteful. Additionally, these handling methods are typically characterized by poor product quality, poor portion control, and occasionally, unsafe conditions.

Conventionally, the raw, prepared potatoes for french frying are stored in large-volume containers in freezer compartments in the fast food outlet. As french fries are required, the container is removed from the freezer, and the prepared potatoes are dispensed from the container into standard frying baskets, then fitted on a rollable correlating standardized storage rack. When the rack has been fitted with its complement of filled french fry baskets, the rack is moved to the vicinity of the french fryer and the baskets are removed and placed in the french fryer for frying of the prepared potatoes as required.

Such a method of handling has numerous disadvantages. For example, as the frozen potatoes are dispensed from the container into the frying baskets, spillage frequently occurs, wasting these potatoes and creating an unsafe condition on the subjacent floor areas, whereby employees or others may slip and fall. Also, a significant number of fries are damaged or broken while being dispensed, resulting in uneven cooking and irregularity in the amount of cooked fries in each bag sold.

Additionally, the individual loading of the filled fry baskets is quite time consuming. The storage racks presently in use comprise multi-tier racks accommodating three fry baskets on each tier. Customarily, the empty fry baskets are arranged in the dispensing area, filled, and individually carried to the storage rack, resulting in a significant amount of waste motion due to inefficient handling methods. Also, the high standards of the better fast food franchises require that the frozen fries be cooked within a specific period of time, usually about 90 minutes after leaving the freezer. Fries which are not cooked within this time period are thrown out, resulting in substantial waste over a period of time.

Even if these time constraints are not applied by the fast food outlet, the cooked product french fry is of poorer quality after a limited exposure to ambient temperatures. Therefore, it is apparent that expeditious fry handling methods which reduce transportation time from freezer to fry vat will additionally result in decreased food waste and better product quality.

Although similar food handling problems have been encountered in other industries, and attempts have been made to solve them by various food guiding means for guiding dispensed foods into containers, such as those described in U.S. Pat. Nos. 2,685,395 and 2,874,736, so far as is known, such means have previously not been employed in frozen fry handling operations in the fast food industry. Further, the structure and function of guide means such as those noted above are peculiarly applicable to a narrow range of foods, and wholly unsuitable for use in conjunction with frozen fry handling operations.

SUMMARY AND OBJECTS OF THE INVENTION

Broadly, the invention comprises plural aperture dispensing means for dispensing frozen fries into standard fry baskets, and a method of loading a movable storage rack with frozen fries including the use of said dispensing means, whereby fry transportation time from freezer to vat and food wastage is reduced, while better portion control and product quality is achieved.

It has been found that the dispensing means and loading method of this invention significantly increase the efficiency of frozen fry handling operations in the fast food industry. Time and motion studies performed to experimentally evaluate the efficiency of the article and method of the invention have shown that up to about a 30% savings on labor during loading of the storage rack can be expected by using the article and method of this invention, owing to the decrease in time required for loading. Additionally, an increase in product yield or fries delivered to the consumer of up to about 10% can typically be expected, owing to decreased waste and better portion control.

Accordingly, it is an object of this invention to provide efficient means for dispensing frozen fries into standard fry baskets fitted on a storage rack which decreases rack-loading time, thereby decreasing labor costs and/or increasing volume, minimizing waste, and improving product quality.

It is another object of the invention to provide efficient means for dispensing frozen fries into standard fry baskets fitted on a storage rack which decrease spillage and damage, thereby minimizing waste and improving product quality, portion controllability, and safety conditions in the dispensing vicinity.

It is a further object of this invention to provide an efficient method for loading a movable storage rack with frozen fries, which decreases rack-loading time, thereby decreasing labor costs and/or increasing volume, minimizing waste, and improving product quality.

It is an additional object of this invention to provide an efficient method for loading a movable storage rack with frozen fries which decreases spillage and damage, thereby minimizing waste and improving product quality, portion controllability and safety conditions in the loading vicinity.

BRIEF DESCRIPTION OF THE DRAWINGS

FIG. 5 is a side view of a conventional multi-tier french fry storage rack with a tier of fry baskets in place;

FIG. 6 is a side view of the rack and baskets of FIG. 5, showing the dispenser of FIG. 1 in place, and frozen french fries being loaded;

FIG. 7 is a side view of the rack and baskets of FIG. 6, showing the first tier of fry baskets filled and dispenser raised;

FIG. 8 is a side view of the rack and baskets of FIG. 7, showing a second tier of empty fry baskets in place;

FIG. 9 is a side view of the rack and baskets of FIG. 8, showing the dispenser of FIG. 1 in place, and frozen french fries being loaded; and FIG. 10 is an elevation of the dispenser of this invention shown in conjunction with a conventional multi-tier storage rack and fry baskets.

DETAILED DESCRIPTION

Figure 1:
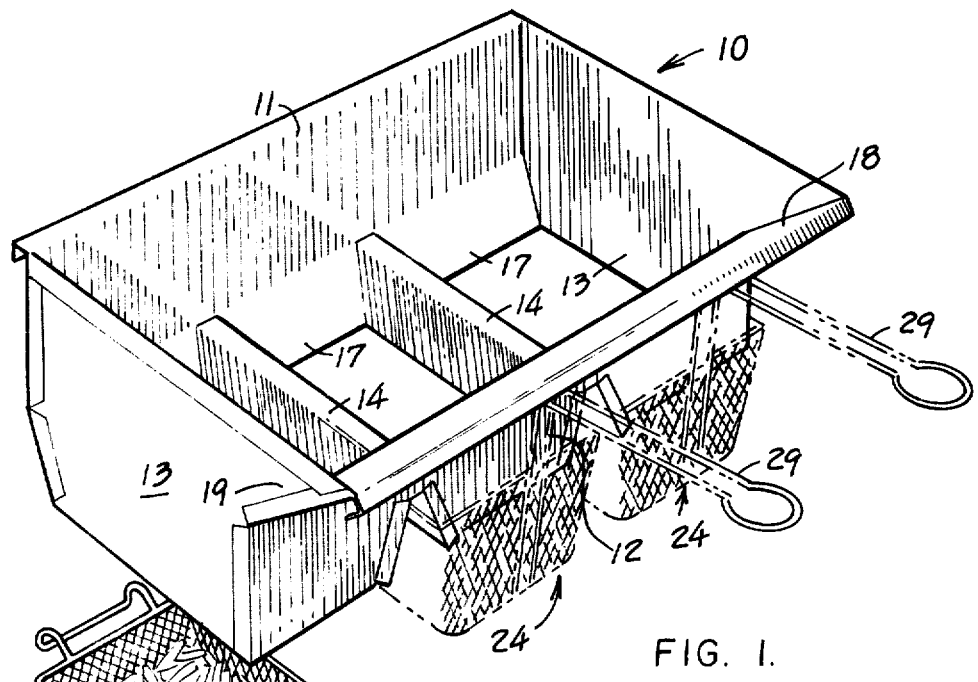
FIG. 1 is a top quarter elevation of the plural aperture dispenser of this invention shown in conjunction with conventional french fry baskets.
Figure 2:
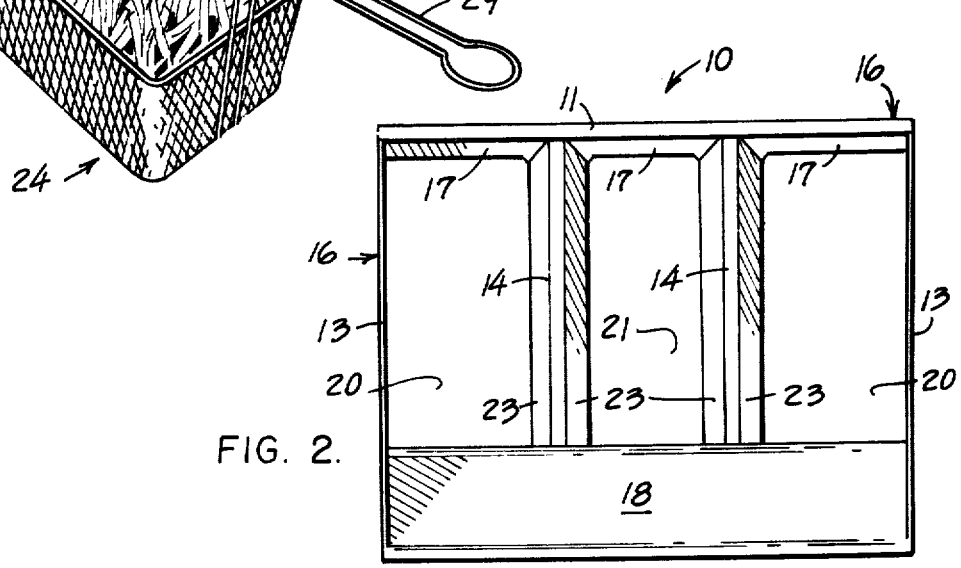
FIG. 2 is a top view of the dispenser of FIG. 1.
Figure 4:
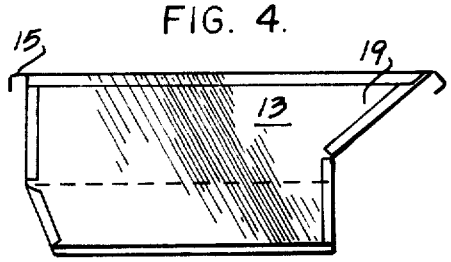
FIG. 4 is a back view of the dispenser of FIG. 1.
Figure 3:
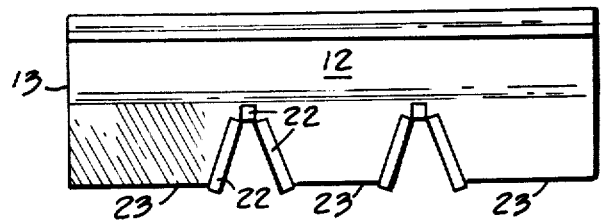
FIG. 3 is an end view of the dispenser of FIG. 1.

With particular reference to FIGS. 1–4, a plural aperture dispenser 10, including planar, front panel 11, planar, back panel 12, planar, side or end panels 13, and a pair of partitions 14 is illustrated. Front panel 11, back panel 12 and side panels 13 form vertical peripheral wall 16, which inwardly converges at lower portion 17 of front panel 11 and outwardly diverges at upper portion 18 of back panel 12, thereby forming an upper angled surface with flanges 19 of end walls 13. Preferably, inwardly converging lower portion 17 forms an angle of about 30° with peripheral wall 16, thereby forming a "bounce surface" for improved dispensing. The upper portion of front panel 11 is extended beyond peripheral wall 16 to form a hook member 15. Dispenser 10 is divided into two generally equal compartments 20 and a middle compartment 21 by V-shaped partitions 14 disposed between front panel 11 and back panel 12, and attached to peripheral wall 16 by tabs 22, which are welded or otherwise securely fastened in place. Each of the generally rectangular compartment 20 is thus provided with a front angled surface formed by inwardly converging lower portion 17 of front panel 11, and a side angled surface formed by inwardly converging sides 23 of partitions 14; middle compartment 21 has of course two side angled surfaces.

The dimensions of lower surface 23 of each of the compartments 20 and 21 are somewhat smaller than the corresponding dimensions of a standard fry basket, so that when dispenser 10 is disposed over fry baskets 24 as shown in FIG. 1, lower surface 23 will be continued within fry baskets 24.

With particular reference to FIGS. 5–10, the plural aperture dispenser 10 is shown in use in conjunction with a standard multi-tier fry basket storage rack 26 to illustrate steps in an improved method of loading french fries onto rack 26.

As shown in FIG. 5, a tier of empty fry baskets 24 is placed on rack 26. In FIG. 6, dispenser 10 is shown disposed over fry baskets 24 on storage rack 26, with frozen fries being poured from a container 27 into dispenser 10 and thence to fry baskets 24. As may particularly well be seen in FIG. 10, hook 15 of dispenser 10 is conformed to fit over bars 28 of rack 26, and outwardly diverging upper portion 18 of back panel 12 rests neatly on handles 29 of baskets 24, thereby holding dispenser 10 in place on the rack, and preventing the dispenser from tilting with the weight of the poured frozen fries. Also, it may be seen that partitions 14 draw baskets 24 together on the tier when dispenser 10 is in loading position, and further prevent frozen fry spillage between the baskets.

FIG. 7 shows rack 26 with a first tier of filled fry baskets 24, and dispenser 10 positioned sufficiently above the filled baskets to permit a second tier of empty baskets 24 to be placed above the first tier of filled baskets as in FIG. 8. As shown in FIG. 9, dispenser 10 is then lowered into place over the second tier of baskets, and frozen fries are poured through dispenser 10 into empty baskets 24. This method is repeated until the storage rack is as full as desired.

It is apparent that the dispenser 10 is readily employable in conjunction with standard fry baskets and storage racks therefor, and thereby also provides an improved method for loading frozen fries on a storage rack.

It is to be understood that the foregoing description is merely illustrative of preferred embodiments of the invention and the scope of the invention is not to be limited thereto, but is to be determined by the scope of the appended claims.

What is claimed is:

1. Plural aperture dispensing means for dispensing frozen uncooked sliced potatoes into fry baskets disposed on a multi-tier french fry storage rack, comprising:
    a. a vertical, planar front panel having a lower portion inwardly converging at an angle from the vertical, thereby providing a lower angled surface for deflecting the potatoes into the corners of a plurality of fry baskets;
    b. a vertical, planar back panel having an outwardly diverging upper portion at an angle from the vertical;
    c. two vertical, planar end panels each having flanges corresponding to the outwardly diverging upper portion of said back panel, said front panel, back panel and end panels being serially joined to form the peripheral wall of said dispensing means; and,
    d. a plurality of V-shaped partitions disposed between said front panel and said back panel to form a plurality of generally rectangular compartments within said peripheral wall whereby at least one side of each compartment is inwardly converging, said V-shaped partitions being further disposed with the apex of the partition uppermost, whereby the width of the bottom of each compartment is substantially smaller than the width of the top of each compartment.

2. The plural aperture dispenser means of claim 1, further including hook means for hooking on horizontal bars on each tier of said storage rack, said front panel defining an upper portion, said hook means comprising an extension of said upper portion of said front panel deformed to fit over said horizontal bars.

3. The plural aperture dispenser means of claim 1, wherein said plurality of compartments comprises three compartments, and said plurality of partitions comprises two partitions.

4. The plural aperture dispenser means of claim 1, wherein the converging angle of said front panel from the vertical is about 30°.

5. A method for loading uncooked frozen sliced potatoes onto a multi-tier french fry storage rack having horizontal bars corresponding to each tier, comprising:
   a. disposing empty fry baskets on a first tier of said storage rack;
   b. positioning a dispensing means comprising a plural aperture dispenser on a next higher tier over said fry baskets so that the lower periphery of each of a plurality of compartments of said dispensing means is contained within the corresponding fry basket;
   c. pouring the sliced potatoes through said dispensing means into said fry baskets;
   d. raising said dispensing means to a position above said next higher tier and securing said dispensing means in this position and,
   e. disposing empty fry baskets on said next higher tier of said storage rack, repositioning the dispensing means according to step (b).

6. The method of claim 5 further including continuing by this method to load a plurality of tiers of baskets.

7. The method of claim 5 wherein step (b) includes positioning said dispensing means by hooking means of said dispensing means over a corresponding horizontal bar on said storage rack.

8. The method of claim 5 wherein step (b) includes resting the dispensing means on the fry baskets for support thereof.

* * * * *

UNITED STATES PATENT AND TRADEMARK OFFICE
CERTIFICATE OF CORRECTION

PATENT NO. : 3,889,724

DATED : June 17, 1975

INVENTOR(S) : Donald L. Anthony

It is certified that error appears in the above-identified patent and that said Letters Patent are hereby corrected as shown below:

Column 3, lines 54-55,
"continued" should read --contained--.

Signed and Sealed this fourteenth Day of October 1975

[SEAL]

Attest:

RUTH C. MASON
*Attesting Officer*

C. MARSHALL DANN
*Commissioner of Patents and Trademarks*